No. 805,587. PATENTED NOV. 28, 1905.
A. SKOFSRUD.
VALVE ROD AND WRIST PIN CONNECTION.
APPLICATION FILED MAR. 7, 1905.

Witnesses:
M. C. Siktberg.
M. Noble

Inventor,
Anton Skofsrud,
By Glenn S. Noble,
Att'y.

UNITED STATES PATENT OFFICE.

ANTON SKOFSRUD, OF CHICAGO, ILLINOIS.

VALVE-ROD AND WRIST-PIN CONNECTION.

No. 805,587.  Specification of Letters Patent.  Patented Nov. 28, 1905.

Application filed March 7, 1905. Serial No. 248,868.

*To all whom it may concern:*

Be it known that I, ANTON SKOFSRUD, a citizen of the United States, residing at Chicago, in the county of Cook and State of Illinois, have invented certain new and useful Improvements in Valve-Rod and Wrist-Pin Connections, of which the following is a specification.

This invention relates more particularly to the pivotal connection between a valve-rod and a wrist-pin or between any similar connecting-rod or pitman and its corresponding crank-pin.

A specific application for which this invention is preferably adapted is the connection between the valve-rods and the wrist-pins on the wrist-plates of engines of the Corliss type.

It consists more particularly in the combination with a rod and pin of a suitable connecting pivotal device which may be readily adjusted to take up wear and which will adjust in both directions, so that the center of rotation will not be disturbed.

I have illustrated an embodiment of this invention in the accompanying drawings, in which—

Figure 1:
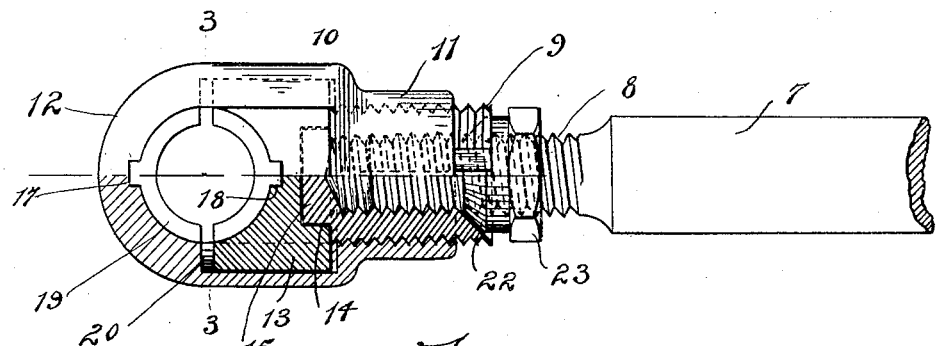
Figure 2:
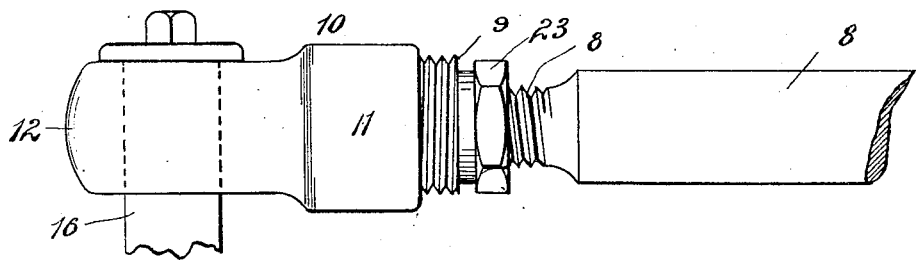
Figure 3:
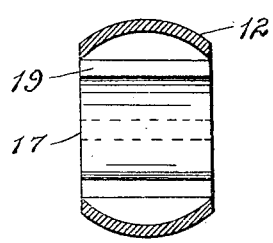
Figure 4:
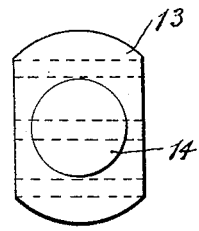
Figure 5:
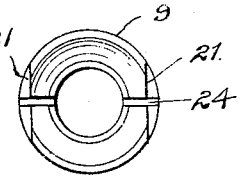
Figure 6:
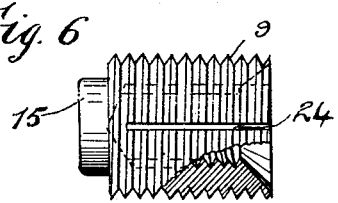

Figure 1 is a front view of a wrist-pin connection with parts broken away to show the interior construction. Fig. 2 is an edge or side view of the device shown in Fig. 1 with the wrist-pin in place. Fig. 3 is a sectional view taken on the line 3 3 of Fig. 1. Fig. 4 is an end view of a slidable adjusting member or follower. Fig. 5 is an end view of the adjusting-sleeve, and Fig. 6 is a side view of the adjusting-sleeve with a small portion broken away.

As shown in Fig. 1, 7 represents a valve or connecting-rod which is threaded at its reduced end 8 with either a right or left handed thread, as desired. The threaded end 8 engages with an adjusting-sleeve 9, which is threaded to receive the same and which is also threaded along its outer periphery with an oppositely-turned thread to that of the stem 8, but of the same pitch.

An adjustable end piece 10, comprising a collar 11 and a bearing portion 12, engages with the sleeve 9, as shown in Figs. 1 and 2. The bearing portion 12 of the end piece 10 is turned for a suitable distance on the inside to receive a coacting slidable bearing-piece or follower 13. The sides of the end piece 10 are cut away to allow the introduction of the follower 13 and the follower correspondingly flattened on each side. At the inner end of the follower 13 is a recess 14, adapted to receive a projection or lug 15 on the forward end of the sleeve 13. The end piece 10 and the follower 13 may be made of suitable bearing material and engage directly with the wrist-pin 16. However, I prefer in many cases to slot the end piece and the follower, as at 17 and 18, and introduce suitable cylindrical bearing members or bushings 19, as shown in Figs. 1 and 3. These bearing-pieces may be made of babbitt or other suitable composition and are readily replaced as soon as worn. In order to allow for adjustment of the follower 13 and the end piece 10, they are cut away for a slight distance on either side of the center line, as shown at 20 in Fig. 1.

The rear end of the sleeve 9 is flattened at 21, where it projects beyond the end of the collar 11, so that it may be readily turned with a wrench; but of course any other convenient means for turning the sleeve may be provided. The sleeve is also countersunk or interiorly beveled at this end to receive the correspondingly beveled or tapered end 22 to a lock-nut 23, which is threaded to engage with the stem 8. The sleeve is also split at 24, so that it may be spread by the locking-piece 23 to bind it against the inner walls of the collar 11.

The operation of this device will be readily understood from the above description and drawings. The parts having been assembled in adjusted position and locked by means of the locking nut or collar 23 will remain in such position until the bearings have become worn. In order to take up the lost motion consequent upon such wear, the nut 23 is loosened and the sleeve 9 is free to be turned. This is then turned by means of a wrench, and its forward end 15 pushes the follower 13 toward the center of the wrist-pin. Simultaneously the sleeve 9 is itself drawn away from the center of the wrist-pin a corresponding distance and carries with it the end piece 10. The threads on the stem 8 and on the sleeve 9 being of the same pitch, the movement of the follower 13 toward the center will be exactly the same as the movement of the end piece 10, so that no readjustment of the rod 7 is necessary.

It will thus be seen that this device is a great improvement over any wrist-pin connections now in use on Corliss engines, as all such devices necessitate the adjustment of the valve-rods after the connecting devices have been adjusted to take up the wear.

All of the parts of my improved connection may be made from cylindrical stock and substantially all of the work done on suitable lathes or screw-machines, so that no castings are necessary and the cost of production is greatly decreased.

When the removable bushings 19 are dispensed with, the connecting device proper only comprises four pieces including the locknut, which is a considerable reduction in the number of parts over devices now in use.

It will also be noted that this device is much more neat and pleasing in appearance than other similar devices and is more readily cleaned, as it does not have any projecting boltheads or nuts.

Having thus described my invention, which I do not wish to limit to the exact construction herein shown and described, what I claim, and desire to secure by Letters Patent, is—

1. In a connecting device of the character set forth, the combination with a rod and wrist-pin, of an adjustable bearing member coacting with said rod and engaging with said pin, and means for adjusting said member whereby the center of rotation will be maintained when the bearing is adjusted.

2. The combination with a valve or connecting rod and a wrist-pin, of an adjustable bearing coacting with said rod and engaging with said pin, said bearing comprising movable parts and means for simultaneously adjusting said movable parts toward or away from the center of the wrist-pin.

3. The combination with a valve or connecting rod, of a threaded adjusting-sleeve, a bearing-piece carried by said sleeve and a second bearing-piece adapted to be adjusted by said sleeve.

4. The combination with a valve or connecting rod, of an adjusting-sleeve, an outer bearing-piece carried by said sleeve, an inner bearing-piece slidably secured in said outer bearing-piece, and adapted to be adjusted by said adjusting-sleeve, and means for locking said sleeve in adjusted position.

5. The combination of a rod having threaded end, an inwardly-threaded sleeve engaging with said rod and having outer threads of the same pitch, an outer bearing-piece threaded to engage with said sleeve, an inner bearing-piece slidably secured in said outer piece and having a recess therein adapted to engage with a projecting end on said sleeve and a lock-nut for said adjusting-sleeve.

6. The combination with a valve or connecting rod, and a wrist-pin, of an adjusting-sleeve adapted to engage with the threaded end of said rod, said sleeve having oppositely-turned threads of the same pitch on its outer circumference, a bearing member adapted to engage with said pin and the threaded portion of said sleeve, said outer bearing member being bored, a second coacting bearing member turned to engage with said bored portion of the first-named member, the arrangement being such that when the sleeve is turned, the inner bearing member will be forced outwardly toward the pin by said sleeve, and means for locking the parts in adjusted position.

7. The combination of a threaded rod, an internally-threaded sleeve engaging with said rod and having a projecting lug at its outer end, said sleeve being outwardly threaded with opposite-handed threads to those of the rod and being split to allow for expansion and having a flattened end portion, a beveled locknut adapted to engage with the correspondingly-beveled end of said sleeve, a collar engaging with said outer threaded portion of said sleeve, said collar being provided with a projecting loop having a guideway therein, a follower adapted to engage with said guideway and with the projecting end of said sleeve, and suitable bushings in said follower and said loop portion adapted to form the bearing for a wrist-pin.

ANTON SKOFSRUD.

Witnesses:
 Thos. Refsum,
 Ralph E. Noble.